E. F. POLAND.
MECHANICAL TOY.
APPLICATION FILED JAN. 25, 1915.
1,143,315.
Patented June 15, 1915.
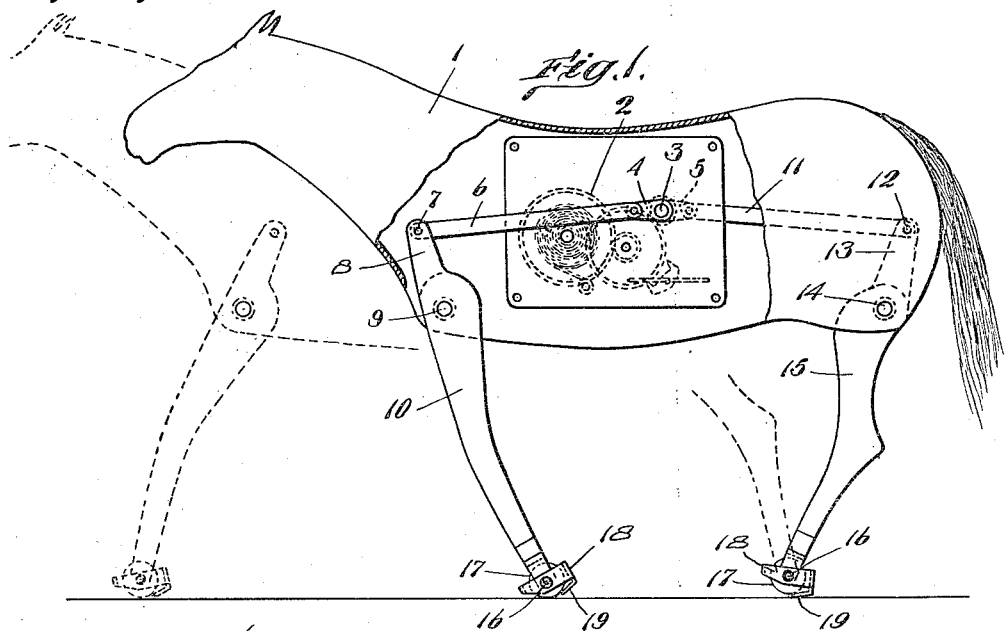
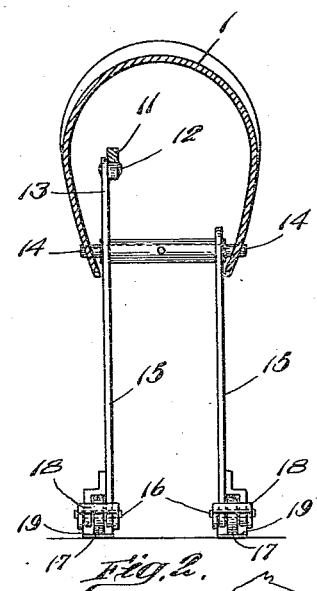
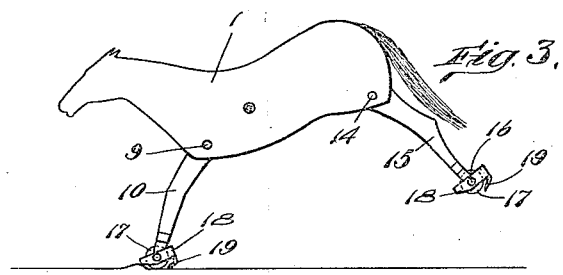
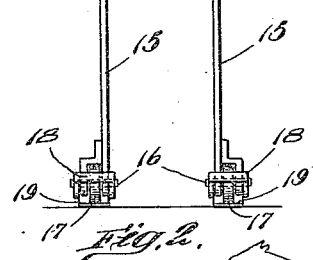
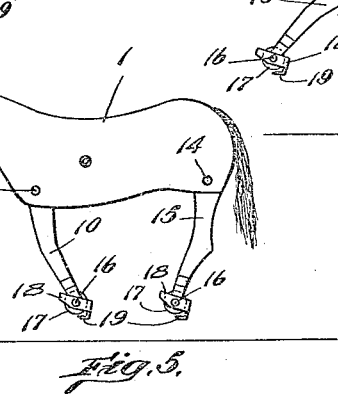

UNITED STATES PATENT OFFICE.

EDWARD F. POLAND, OF BOSTON, MASSACHUSETTS.

MECHANICAL TOY.

1,143,315.   Specification of Letters Patent.   Patented June 15, 1915.

Application filed January 25, 1915. Serial No. 4,132.

*To all whom it may concern:*

Be it known that I, EDWARD F. POLAND, a citizen of the United States, residing at Boston, in the county of Suffolk and State of Massachusetts, have invented an Improvement in Mechanical Toys of which the following is a specification.

This invention relates to mechanical toys of the type in which an operating mechanism is arranged to cause a toy figure to simulate the movements of an animal.

A special object of the invention is to provide means adapted to cause a toy figure such as the figure of a horse to have imparted thereto lively movements such as the movement of a horse in running or of a broncho in bucking.

To this end I provide a power operated mechanism adapted to impart to the fore and hind legs of the figure, movements to cause the figure of the animal to be moved and tilted as is the body of a running horse, and also to be reared in front and behind under certain conditions, thus further simulating the activity of a fractious horse or broncho.

The foregoing and other objects and features of the invention will be better understood from the following detailed description taken in connection with the accompanying drawings and will be thereafter pointed out in the appended claims.

Referring to the drawings: Figure 1 shows in side elevation with parts in section, the operating mechanism and construction of my invention; Fig. 2 is a view in transverse section, with certain parts in elevation; and Figs. 3, 4 and 5 are diagrammatic elevations showing movements and positions that the figure may assume under conditions.

The outline of the animal is indicated at 1, this being constructed of any suitable material, and having formed therewith or housed therein a motor 2 which may be an ordinary spring motor, this typifying any suitable source of motive power. The motor 2 operates a shaft 3 which has fixed thereon opposite crank arms 4, 5. The crank arm 4 is connected by a link 6 with a pivotal connection 7, to the upper end 8 of a pair of spaced apart lever arms fulcrumed to a horizontal pivot pin 9, the lower ends of these arms extending down as seen at 10 to constitute the fore legs of the animal figure, *i. e.*, of a horse as shown. It will be understood that these legs are suitably spaced apart as seen in Fig. 2 so that the figure is properly based and supported against tipping over sidewise. The other lever arm 5 is connected by a link 11 with a pivot connection at 12 to the upper ends 13 of a pair of spaced apart levers fulcrumed at 14, and having lower portions 15 constituting the hind legs of the animal figure. Each of both pairs of legs 10, 15, has pivoted at its lower end as indicated at 16, a roller 17, so that the figure is supported entirely on these rollers. Mounted to swing also on each of these pivots is a bracket 18, having depending therefrom a trigging-plate 19, which is bent inward, said bracket 18 tending by gravity to swing on the pivot 16, as the leg is moved forward, until the trigging-plate 19 comes to a position in engagement with the floor, and owing to the resistance due to the contact between the plate and floor, upon backward motion of the leg, said trigging-plate is caused to engage the lower surface of the roll and lock it against backward rotation. In use it will be understood that upon the motor being set in operation in any suitable way to turn the shaft 3, the action of the crank arms 4, 5 will operate to swing the fore legs 10 and the hind legs 15 of the figure alternately toward each other and away from each other. As the hind legs 15, are swung backward from the position shown in Fig. 1, the rolls borne by them being locked against backward rotation by the trigging-members, these legs are relatively immovable over the floor surface. At the same time the fore legs 10 are swung forward, and this movement relative to the floor surface is permitted as the rolls borne by them are free to roll forward. The result of this is that the figure of the horse is projected forward from its hind legs and the fore legs take a new position ahead. Then as the fore legs and hind legs are simultaneously swung toward each other the trig plates 19 engage the rolls of the fore legs, making the fore legs relatively immovable while the trig plates 19 of the hind legs swing out from under their rollers, permitting the hind legs to move freely over the floor, this simulating the movements of a horse in running or galloping. While this is the normal operation with the mechanism moving over a smooth floor surface, if the floor surface presents some minor impediment, as, for instance, a carpet or rug, the described operation is modified, more or less at random. For instance, either the fore legs or the hind legs in moving forward with their trig plates 19 released, may be obstructed more or less by the nature of the floor surface, and in this event the other pair of legs will be caused to re-act more violently through the interconnection of the operating parts. This causes the figure to rear either on its fore legs or its hind legs as the case may be, depending on which pair of legs encountered the obstruction and occasionally the figure will bodily leave the floor.

In practice, it is found that as the figure is operated on a somewhat rough surface, the movements imparted simulate in large measure, the bucking movements of a broncho or fractious horse, the particular movements imparted, as either the front rollers or the rear rollers and their trig plates are obstructed more or less being uncertain and not capable of being foreseen, thereby adding largely to the amusing and interesting qualities of the device. In Figs. 3, 4 and 5, this capability of varied action is illustrated in different phases.

The invention is not to be understood as limited in all respects to the precise structural details herein shown, and reference is made to the appended claims rather than to the foregoing description to indicate the scope of the invention.

Having described my invention, what I claim as new and desire to secure by Letters Patent is:

1. Apparatus of the kind described, comprising a toy figure having a pair of fore legs and a pair of hind legs, and operating mechanism having connections for moving both fore legs together in the same direction and at the same time moving both hind legs in the opposite direction and trigging-means borne by said legs.

2. Apparatus of the kind described, comprising a toy figure having a pair of fore legs and a pair of hind legs mounted for swinging movement, operating mechanism connected to swing said pairs of legs together, with the fore legs moving in the opposite direction to the hind legs, said legs being mounted on rollers, and means for trigging the rollers upon the backward swing of the legs.

3. Apparatus of the kind described, comprising a toy figure having a pair of fore legs and a pair of hind legs mounted for swinging movement, operating mechanism connected to swing said pairs of legs together, with the fore legs moving in the opposite direction to the hind legs, said legs being mounted on rollers, and a gravity acting device coöperative with each roller and arranged to trig it upon the backward swing of its leg.

4. Apparatus of the kind described, comprising a toy figure having front and hind legs pivoted thereto, operating means having crank arm and link connections to said legs arranged to move them toward each other and away from each other alternately, and rollers at the lower extremities of said legs having trig plates swingingly mounted to coöperate therewith, arranged to permit said rollers to be operative in one direction of leg movement, and to trig the same upon a tendency to movement in the opposite direction.

In testimony whereof, I have signed my name to this specification, in the presence of two subscribing witnesses.

EDWARD F. POLAND.

Witnesses:
B. J. NOYES,
H. B. DAVIS.

Copies of this patent may be obtained for five cents each, by addressing the "Commissioner of Patents, Washington, D. C."